(12) United States Patent
Kellinger et al.

(10) Patent No.: US 11,293,413 B2
(45) Date of Patent: Apr. 5, 2022

(54) GRAVITY FIELD ENERGY STORAGE AND RECOVERY SYSTEM

(71) Applicants: James Francis Kellinger, Cliffside Park, NJ (US); Michael Thane MacKay, Port Saint Lucie, FL (US)

(72) Inventors: James Francis Kellinger, Cliffside Park, NJ (US); Michael Thane MacKay, Port Saint Lucie, FL (US)

(*) Notice: Subject to any disclaimer, the term of this patent is extended or adjusted under 35 U.S.C. 154(b) by 0 days.

(21) Appl. No.: 16/801,541

(22) Filed: Feb. 26, 2020

(65) Prior Publication Data

US 2020/0217302 A1 Jul. 9, 2020

Related U.S. Application Data

(63) Continuation-in-part of application No. 14/490,630, filed on Sep. 18, 2014, now Pat. No. 10,138,875.

(51) Int. Cl.
*F03G 3/00* (2006.01)
*F03B 13/18* (2006.01)

(52) U.S. Cl.
CPC .............. *F03G 3/00* (2013.01); *F03B 13/186* (2013.01); *F03G 3/087* (2021.08); *F03G 3/094* (2021.08); *F03G 3/096* (2021.08); *F05B 2220/708* (2013.01); *Y02B 10/30* (2013.01); *Y02E 10/30* (2013.01)

(58) Field of Classification Search
CPC .. F03B 17/00–04; F03G 3/00–08; F03G 7/00; F03G 7/08; F03G 7/10; F03G 2730/00; F03G 2730/06; F03G 3/087; F03G 3/094; F03G 3/096; Y02E 60/16
USPC .............. 185/27, 29, 30, 31, 32, 33, 35, 36; 60/495–507
See application file for complete search history.

(56) References Cited

U.S. PATENT DOCUMENTS

| | | | |
|---|---|---|---|
| 2009/0212570 A1* | 8/2009 | Le | F03D 9/25 290/52 |
| 2010/0107627 A1* | 5/2010 | Morgan | F03B 13/1885 60/495 |
| 2012/0274079 A1* | 11/2012 | McCoy | H02K 7/1823 290/1 R |
| 2012/0280515 A1* | 11/2012 | Huang | F03B 13/06 290/1 C |

FOREIGN PATENT DOCUMENTS

DE 102012222610 A1 * 6/2014 ............. F03D 9/008

* cited by examiner

*Primary Examiner* — Mark A Laurenzi
*Assistant Examiner* — Mickey H France

(57) ABSTRACT

Device for storing energy, using a physical object, such as a mass or buoyant object floating in fluid. A mass is repositioned to greater altitude in a gravitational field to a position of higher potential energy. A buoyant object is forcibly submerged into a fluid, displacing fluid, to a position of higher potential energy. The stored potential energy may be recovered with extremely low loss regardless of the state of charge of the system, or length of time of the storage. Maintaining the charge is indefinitely lossless.

16 Claims, 6 Drawing Sheets

GRAVITY FIELD ENERGY STORAGE AND RECOVERY SYSTEM

BACKGROUND OF THE INVENTION

1. Field of the Invention

Significant advances have been made in alternative energy systems as society seeks to ameliorate the deleterious effects inherent in legacy energy systems. Fossil fuel systems rely on the combustion of hydrocarbons such as ethane, n-pentane, methane, n-octane, and coal, which, under perfect conditions, will produce heat and kinetic energy and the by-products of water and carbon dioxide. As an example, the combustion of methane in the presence of air is stoichiometric as

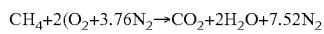

An array of hydrocarbons that are the constituents of gasoline (a well-known example is n-octane), as well as the hydrocarbons associated with coal and fuel oil, all burn in a similar fashion. Automobile engines rely on the Carnot cycle and gas turbines, powering jet aircraft and marine propulsion, rely on the Brayton cycle to harness, through a mechanical arrangement, the rapid gas expansion of the burning fuel to develop continuous shaft horsepower.

Commercial electric power is produced when coal or fuel oil is burned to boil water, the steam being used to turn a turbine as per the Rankine cycle, producing a continuous shaft horsepower. Nuclear electric power generation utilizes a controlled nuclear fission of uranium and it's byproducts as a heat source to boil water, and similarly, develops a continuous shaft horsepower from a steam turbine. In both cases, the continuous shaft horsepower is used to rotate an electric generator.

The problems associated with our legacy systems dominate our technological, economic, strategic, scientific, and geopolitical landscapes. An energy hungry world seeks to control the world's precious hydrocarbon resources resulting in "blood for oil" military conflicts which themselves carry a risk of escalation to a global scope, raising the terrible specter of exchanged nuclear strikes between states equipped with atomic weapons.

According to the National Science and Technology Council (NSTC) "the use of hydrocarbons as a fuel, even under perfect conditions, emits carbon dioxide as a byproduct, which as a greenhouse gas" is implicated in global warming." Rarely are the conditions perfect however, and the burning of hydrocarbon emits many unfortunate byproducts which otherwise pollute the air, causing serious human health problems.

According to the US Department of Energy nuclear electric power generation has the advantage that it emits no greenhouse gases though there are a number of thorny problems associated with nuclear power—the mining, refining, and processing of uranium ore into a useable material, is an environmentally costly process with associated health risks. The operation of nuclear power stations is not foolproof as the disasters at Three Mile Island, Chernobyl, and Fukushima demonstrate. The operation of nuclear power reactors produces a plethora of fission products associated with the spent nuclear fuel. Nuclear waste disposal involves the processing, transportation, and storage of these fission products. This presents an ongoing national problem involving challenging technological, scientific, strategic, and political issues. Moreover, spent nuclear fuel presents a security risk, as the proliferation of fissile materials can resent opportunities to "rogue states" to obtain weapons grade nuclear materials.

The development and deployment of alternative energy systems beyond the legacy systems has the potential to alleviate many of the above problems. Light energy from the Sun striking the Earth is a far greater potential source of energy than all of the world's proven oil reserves. But new challenges arise due to the nature of the alternative systems.

Many of the alternative energy systems are not continuous systems but are time-varying as they only generate power when the alternative energy source is available. Solar powered photovoltaic cells produce appreciable power only when sufficient sunshine is available. Wind generators produce power only when the wind is blowing, Tidal water systems generate energy only when the water is moving, etc. This non-continuous, or periodic power harvesting technology requires massive energy storage systems to transform the periodic energy pulses to a quasi-continuous system to meet society's demand.

2. Description of Related Art

Each of the periodic alternative energy systems rely on an energy storage system to capture the excess energy and deliver it when required. A typical alternative energy system will generate electrical energy. Solar photovoltaic cells, wind generators, tidal and wave generators will use batteries and a battery charging system to store excess electrical energy. When required, the batteries will be switched from charging mode into discharging mode to apply the stored electrical energy. The electrical energy delivered is in the form of Direct Current (DC) electrical energy and may require the use of DC to DC converters and DC to AC (Alternating Current) inverters to deliver the stored energy in a form that is directly usable.

These periodic alternative energy systems then, rely on the added complexity and expenses related to energy conversion and chemical battery storage technologies. Chemical Batteries suffer from low energy/power density, poor low-temperature performance, limited cycle life, intrinsic safety limitations, and high cost.

An important consideration in any energy conversion technology is the efficiency of the system, which describes the losses inherent in the conversion. Lead acid batteries are commonly used in small photovoltaic systems. Sandia National Laboratories studied lead acid battery efficiencies and found that efficiencies are as low as 50% if the battery is at a high rate of charge when charging begins. Also, partial charging is deleterious to the battery itself. According to "A Study of Lead-Acid Battery Efficiency Near Top-of-Charge and the Impacton PV System Design by John W. Stevens and Garth P. Corey:

"This result has important implications to operational PV systems. That is, if a battery is partially charged for several consecutive cycles (for example, the array is marginally sized and there is a series of less than full sun days in the winter) the useable battery capacity decreases each cycle, even though the same amount of energy has been presented to the battery each day. This is the result of battery inefficiencies, electrolyte stratification, and sulfate buildup during these partial charges."

Thus, time-varying alternative energy systems rely upon a storage technology which is inherently inefficient and problematical from an operational, financial, and design standpoint. What is required is an alternative energy storage system that does not require batteries. The Gravity Field Energy Storage & Recovery System Invention is designed to deliver this alternative solution.

SUMMARY OF THE INVENTION

The Gravity Field Energy Storage &. Recovery System invention is a mechanical, electrical and electronic system that has the ability to harness any electrical or mechanical power source and allow it to do work to configure a mechanical system into a state of high potential energy, using either a high mass object in a gravitational field or a large buoyant object submerged into a fluid.

The charging cycle consists of repositioning a massive object in a gravity field to a position of higher potential energy. The potential energy can be stored without loss for extended periods of time.

The potential energy stored in the invention can be recovered on demand. The energy recovery mode consists of releasing the massive object in the gravity field in a controlled fall, producing a kinetic energy which can then be trans-formed into a useable form of energy such as electricity, pneumatic, or hydraulic power.

The work done then, to elevate the mass in the gravitational field, or submerge a buoyant object in a fluid, is manifested as potential energy. The potential energy is stored indefinitely as long as the mechanism is in working order. This energy storage technique will not lose any potential energy over time unlike many other energy storage systems.

The mass suspended in a gravitational field is coupled to an apparatus that can convert the stored potential energy. The locking mechanism is released and allows the force of gravity to deliver a controlled acceleration of the mass towards the center of gravity. As the mass is accelerated in the gravitational field, the energy conversion apparatus, converts the kinetic energy into a useful energy form, specifically, a rotating shaft, and ancillary mechanisms such as a rotating electric generator coupled to the rotating shaft.

The present invention works the same in the context of a fluid whether the fluid is gas or liquid. This method would also work in a vacuum. If the mass is less dense than the surrounding fluid, it would be buoyant and tend to "float," In such a case, mechanical energy can be stored by forcing the mass to submerge into the fluid. The energy can be recovered by allowing the mass to float, recovering the energy as the mass displaces upward. This would apply to a buoyant object in water, or a lighter than air vessel or dirigible. Forcing the dirigible toward the center of the earth would be to reposition it to a position of higher potential energy. This energy can be recovered in a "controlled float" as the tethered dirigible rises in the atmosphere. Forcing a buoyant object in water to submerge stores energy, which can be recovered as the object is allowed to rise.

Thus, a buoyant object can be repositioned to a position of higher potential energy by forcing it to submerge into a fluid and can be used to store energy. The energy storage can be released on demand, producing a kinetic energy which can then be transformed into a useable form of energy such as electricity, pneumatic, or hydraulic power. Similarly a massive object can be repositioned to a position of higher potential energy by raising its altitude and can be used to store energy. The energy storage can be released on demand, producing a kinetic energy, which can then be transformed into a useable form of energy such as electricity, pneumatic, or hydraulic power.

DETAILED DESCRIPTION OF THE INVENTION

Figure 1:
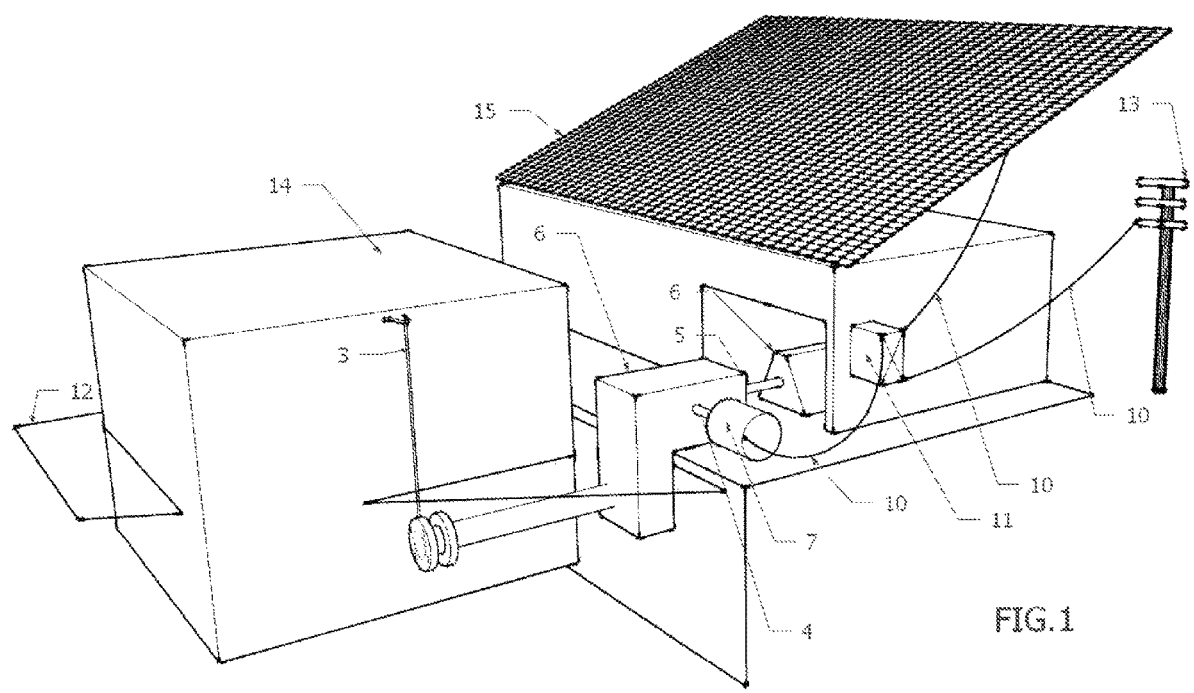
FIG. 1 Shows the invention implemented at a factory near a river.

The Gravity Field Energy Storage & Recovery System is a mechanical, electrical and electronic system that can store energy from a variety of sources. The energy is directed at a mechanical/electrical device designed to raise a large object in a gravitational field, storing the energy as potential energy in the field.

The Force of Gravity is described as the mutual physical attraction, which every particle in the universe has with every other particle in the universe. Newton discovered the universal law of gravitation in the year 1686 and described the force of gravity as $$F = \frac{GM_a M_b}{r^2}$$

Where M, and M, are the masses of two particles, r is the distance between the particles, and G is a constant of proportionality. The constant G, was first measured by Cavendish in 1771 and the accepted value today is $$G = 6.67 \times 10^{-11} \text{ Nm}^2/\text{kg}^2$$

A large ensemble of particles such as a planet, acts as an aggregated single object with a mass equal to the sum of the masses of the particles, and the force of gravity is directed at the center of mass of the ensemble. Thus, the force of gravity upon an object near the surface of the Earth is $$F = \frac{GM_e m}{r^2}$$

Where $M_e$ is the mass of Earth taken as $5.98 \times 10^{24}$ kg, m is the mass of an object infinitesimally less massive than earth, and r is the distance between their centers of mass. The force is direct toward the center of the earth.

The acceleration due to gravity is $$a = \frac{F}{m} = \frac{GM_e}{r^2} = 9.8 \text{ m/s}^2 \cong 32 \text{ ft/s}^2$$

Interestingly, it is independent of the mass of the object. This is the acceleration of gravity near the surface of the earth, which is usually denoted with a lower case italic g.

We calculate the change in g with increasing altitude, such $$g(r) = \frac{GM_e}{r^2}$$

$$\Delta g(r) = \frac{dg}{dr}\Delta r$$

$$= -\frac{GM_e}{r^3}\Delta r$$

$$= -\frac{2g}{r}\Delta r$$

$$\frac{\Delta g}{g} = -\frac{2\Delta r}{r}$$

The fractional change of g at the earth's surface, where $r=6\times10^6$ m, increases one part per million for every increase in altitude of 3 meters. This insignificant change is very important in considering the present invention in that the efficiency of the energy storage does not change in relation to the state of charge.

Aristotelian mechanics, which was accepted for thousands of years, believed that a force was necessary to maintain a body in uniform motion. Newton, through experimentation found rather that a Force acting upon a body accelerates the body according to his famous $2^{nd}$ Law. The law in one dimension can be integrated as $$F = \frac{d}{dt}Mv$$

$$F(x) = m\frac{dv}{dt}$$

$$m\int_{x_a}^{x_b} \frac{dv}{dt}dx = \int_{x_a}^{x_b} F(x)dx$$

And after a formal procedure we find that $$\tfrac{1}{2}mv_b^2 - \tfrac{1}{2}mv_a^2 = \int_{x_a}^{x_b} F(x)dx$$

where the term $$\tfrac{1}{2}mv^2$$

is known as the kinetic energy and the right hand side is called work as the particle moves and changes velocity from a to b. In shorthand we say $$K_b - K_a = W_{ba}$$

This formula is known as The Work-Energy Theorem in one dimension.

In practice we see that a canon ball traveling at high velocity may hit the hull of ship and its velocity reduces to zero. It is the change in velocity, which imparts the energy and does work on the hull. We can also see that the velocity of the canon ball, instead of being supplied by the expanding gasses of the canon, could be supplied by a drop from a vertical height. The canon ball dropped from rest at a given height h above the ground will deliver kinetic energy to do work on the deck of the ship or on the ground in proportion to its height. We can call this a potential energy, which can be released at will. It will require work to elevate the canon ball to its prearranged height. As it turns out the potential energy is equal and opposite the kinetic energy. We say $$E = K + U$$

Where U denotes the potential energy of the system and E is the total mechanical energy of the system, which is always constant since mechanical energy is conserved. Thus, as a mass at rest at a given height represents a potential energy, gravity will accelerate the mass and convert it to kinetic energy as the potential energy is reduced.

The Gravitational Energy Field Storage & Recovery System operates within the Earth's gravitational fields. When we do work to separate masses that are gravitationally attracted to each other we create a form of potential energy. This invention harnesses these forces to store energy and then recover this stored energy on demand.

We can harness energy from a variety of sources to perform the work of repositioning the mass in the gravitational field allowing us to increase the potential energy in the system. We can use the electric utility power grid, electric generator, solar, hydroelectric, geothermal, wind, ocean tidal, ocean current, ocean wave, ocean thermal, nuclear fission, nuclear fusion, hydrogen fuel cell. It includes any energy source, which converts a motion, such as an oscillating motion, to a rotational shaft motion. These sources may also include a tractive pulling force from a diesel tractor or diesel locomotive, or a direct lifting force from a heavy lift helicopter.

Once energy is stored by the repositioning of the mass, we have the ability to recover the energy immediately or to store it indefinitely. The potential energy will remain intact indefinitely if the positioning apparatus remains intact. Once stored, maintaining this energy requires no work and is loss-less for an indefinite period of time unlike battery systems. Unlike battery systems, energy storage can be implemented incrementally up to the storage limit of the system, regardless of the state of charge or history of the system, without loss of efficiency.

The stored energy can be released and recovered by controlling the acceleration of the mass as the potential energy becomes kinetic energy. Kinetic energy can be converted to a plurality of useful energy forms, including electrical, pneumatic, hydraulic and others.

The energy storage phase can be repeated with random or continuous amounts of energy until the unit reaches it energy storage limits. The energy can remain stored for indefinite periods of time without loss.

The stored energy can be released by controlling the acceleration of the mass. The stored potential energy becomes kinetic with the acceleration of the mass in the release cycle.

General System Configuration

Energy can be harnessed from power sources such as: electromechanical, geothermal, wind, ocean tidal, ocean current, ocean wave, ocean thermal, nuclear fission, nuclear fusion, solar, chemical reactions, pneumatic, hydraulic, mechanical, and others, FIG. 1 ELECTRIC/ELECTRONIC CONTROL UNIT 11 chooses power source via ELECTRIC/ELECTRONIC INTERCONNECT 10 from either ELECTRIC POWER GRID 13 or SOLAR ARRAY 15 and delivers power via ELECTRIC/ELECTRONIC INTERCONNECT 10 to ELECTRIC MOTOR 7. ELECTRIC MOTOR 7 rotates FIRST SHAFT 4 delivering energy to TRANSMISSION 6.

TRANSMISSION 6 rotates MAIN SHAFT 1 such that CABLE 3 winds onto the attached REEL 2 forcing BUOYANT OBJECT 14 downward into the fluid to store energy. In discharge cycle, rising BUOYANT OBJECT 14 unwinds CABLE 3 from REEL 2 turning MAIN SHAFT 1 delivering shaft horsepower to TRANSMISSION 6 and powering HYDRAULIC PUMP 17.

Figure 2:
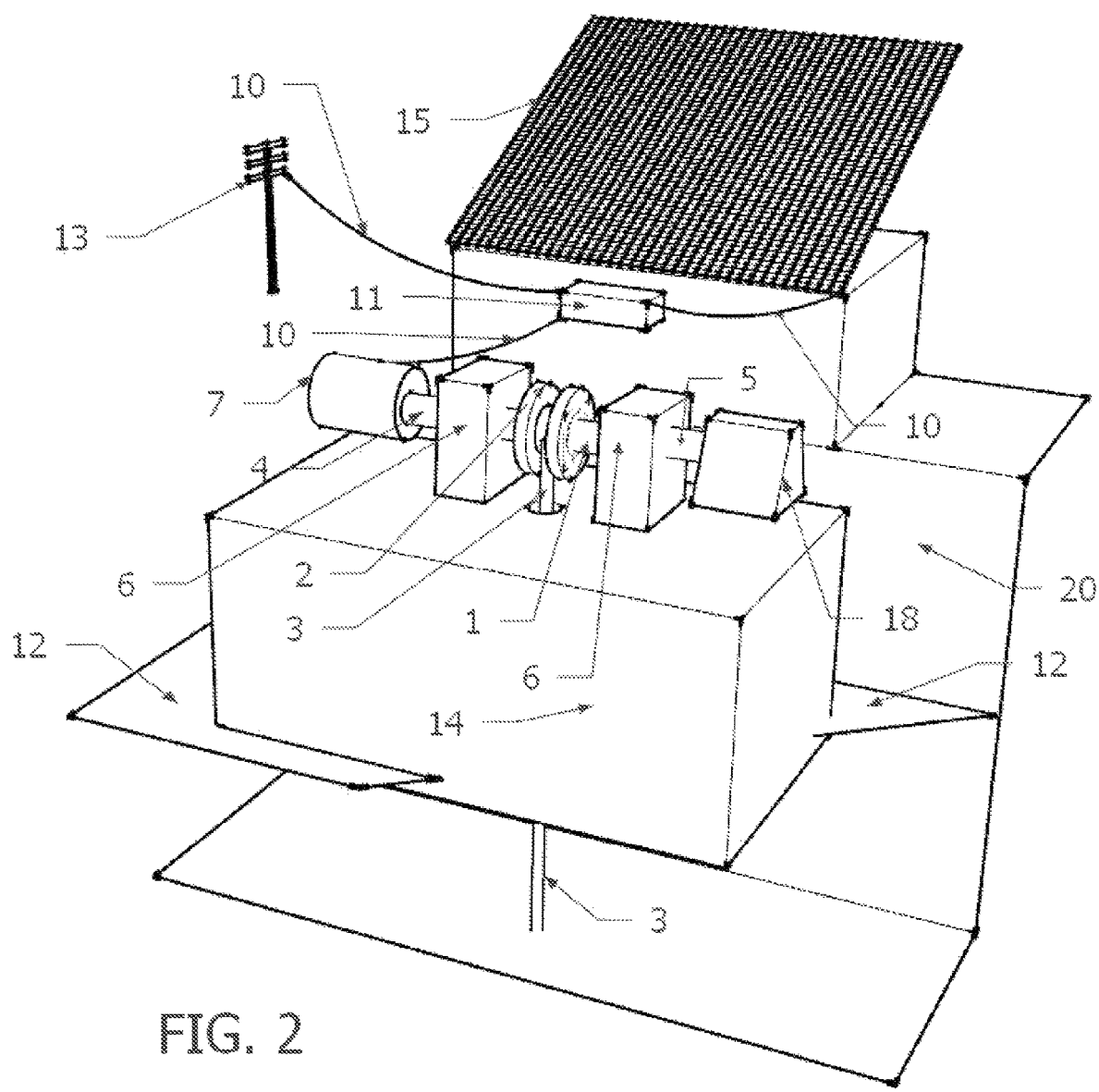
FIG. 2 Shows the invention implemented at a factory near a river.

FIG. 2 ELECTRIC/ELECTRONIC CONTROL UNIT 11 chooses power source via ELECTRIC/ELECTRONIC INTERCONNECT 10 from either ELECTRIC POWER GRID 13 or SOLAR ARRAY 15 and delivers power via ELECTRIC/ELECTRONIC INTERCONNECT 10 to ELECTRIC MOTOR 7. ELECTRIC MOTOR 7 rotates FIRST SHAFT 4 delivering energy to TRANSMISSION 6. TRANSMISSION 6 rotates MAIN SHAFT 1 such that CABLE 3 which, is attached to Earth, winds onto the attached PULLY 2 forcing BUOYANT OBJECT 14 downward into the fluid to store energy. In discharge cycle, rising BUOYANT OBJECT 14 unwinds CABLE 3 from REEL 2 turning MAIN SHAFT 1 delivering shaft horsepower to TRANSMISSION 6 and powering PNEUMATIC PUMP 18.

Figure 3:
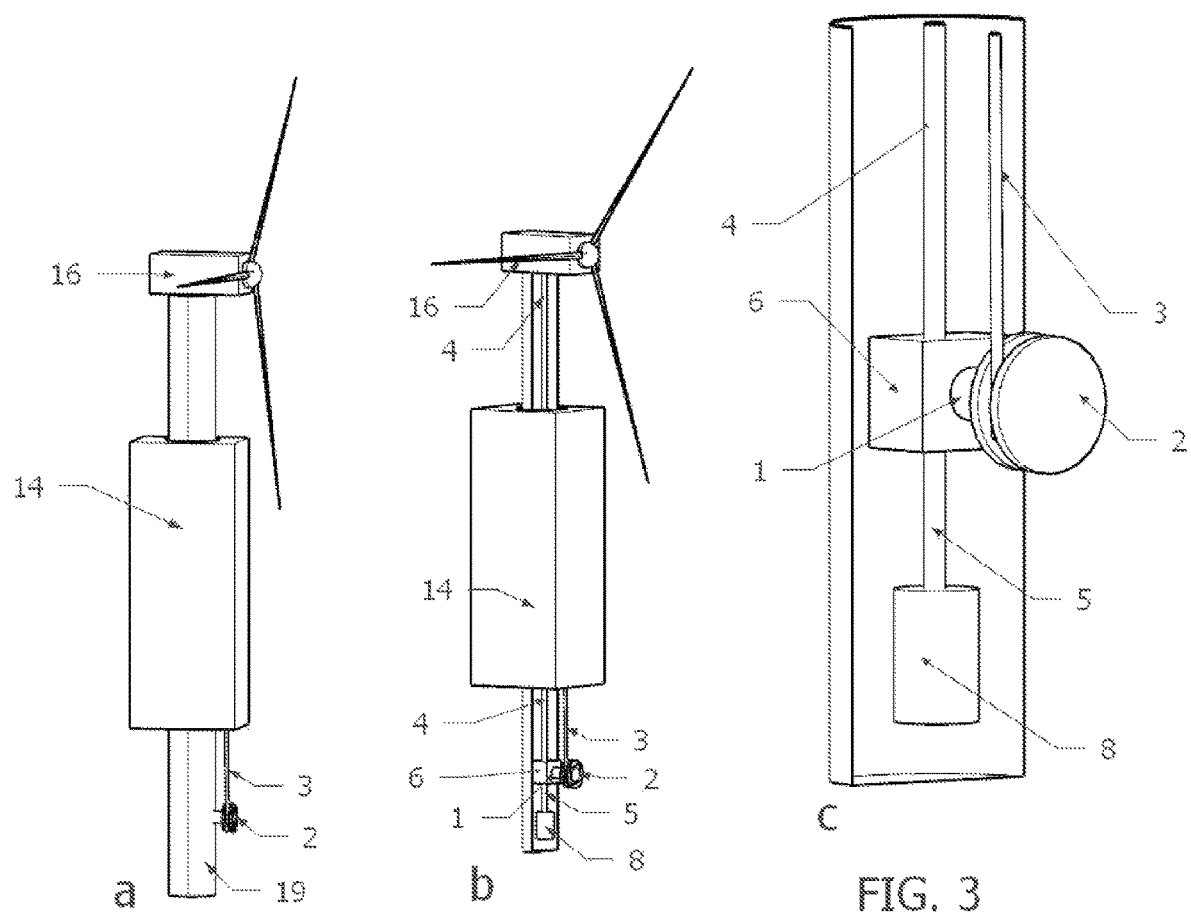
FIG. 3 Drawing (a) shows the invention as it could be installed on an offshore wind turbine. Drawing (b) shows a cross-section view of the wind turbine tower showing internal components. Drawing (c) shows a close up, cross-section view of the wind turbine tower showing internal components.

FIG. 3 WIND TURBINE 16 delivers direct shaft horsepower to TRANSMISSION 6 via FIRST SHAFT 4. TRANSMISSION 6 rotates MAIN SHAFT 1 and attached REEL 2 to wind CABLE 3 forcing BUOYANT OBJECT 14 to submerge, storing energy. In discharge cycle, rising BUOYANT OBJECT 14 unwinds CABLE 3 from REEL 2 rotating MAIN SHAFT 1. TRANSMISSION 6 couples MAIN SHAFT 1 to SECOND SHAFT 5, which rotates ELECTRIC GENERATOR 8.

Figure 4:
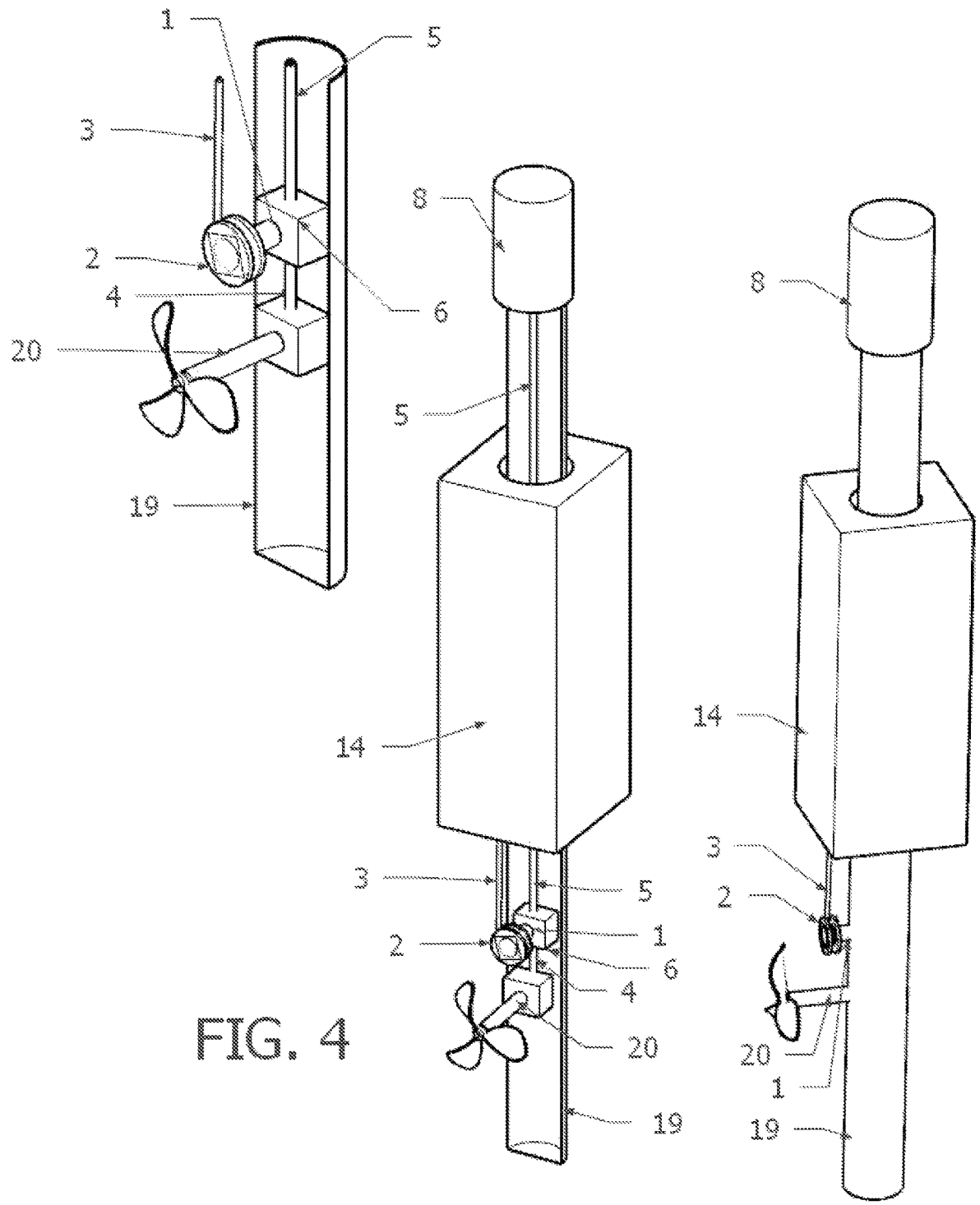
FIG. 4 Drawing (c) shows the invention as it could be installed with a marine turbine in a tide washed river. Drawing (h) shows a cross-section view of internal components. Drawing (a) shows a close up, cross-section view of internal components.

FIG. 4 HYDRO TURBINE 20 delivers direct shaft horsepower to TRANSMISSION 6 via FIRST SHAFT 4. TRANSMISSION 6 rotates MAIN SHAFT 1 and attached REEL 2 to wind CABLE 3 forcing BUOYANT OBJECT 14 to submerge, storing energy. In discharge cycle, rising BUOYANT OBJECT 14 unwinds CABLE 3 from REEL 2 rotating MAIN SHAFT 1. TRANSMISSION 6 couples MAIN SHAFT 1 to SECOND SHAFT 5, which rotates ELECTRIC GENERATOR 8.

Figure 5:
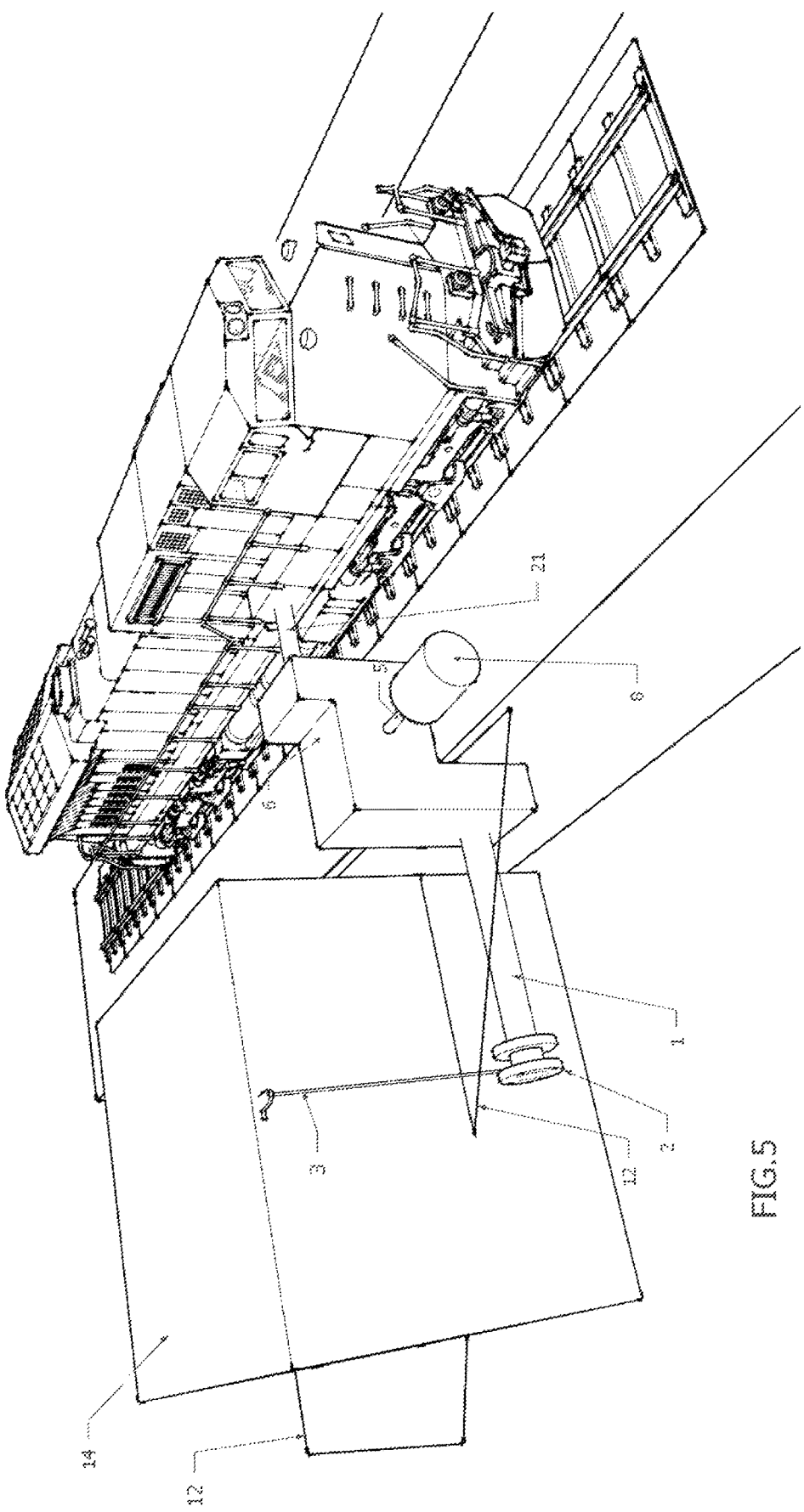
FIG. 5 shows the invention at a rail siding driven by the power take-off of a diesel locomotive.

FIG. 5 LOCOMOTIVE POWER TAKE-OFF SHAFT 21 rotates FIRST SHAFT 4 delivering energy to TRANSMISSION 6. TRANSMISSION 6 rotates MAIN SHAFT 1 such that CABLE 3 winds onto the attached REEL 2 forcing BUOYANT OBJECT 14 downward into the fluid to store energy. In discharge cycle, rising BUOYANT OBJECT 14 unwinds CABLE 3 from REEL 2 rotating MAIN SHAFT 1. TRANSMISSION 6 couples MAIN SHAFT 1 to SECOND SHAFT 5 which rotates ELECTRIC GENERATOR 8. A conventional, known track and a conventional, known locomotive comprising a power take-off shaft are shown.

Figure 6:
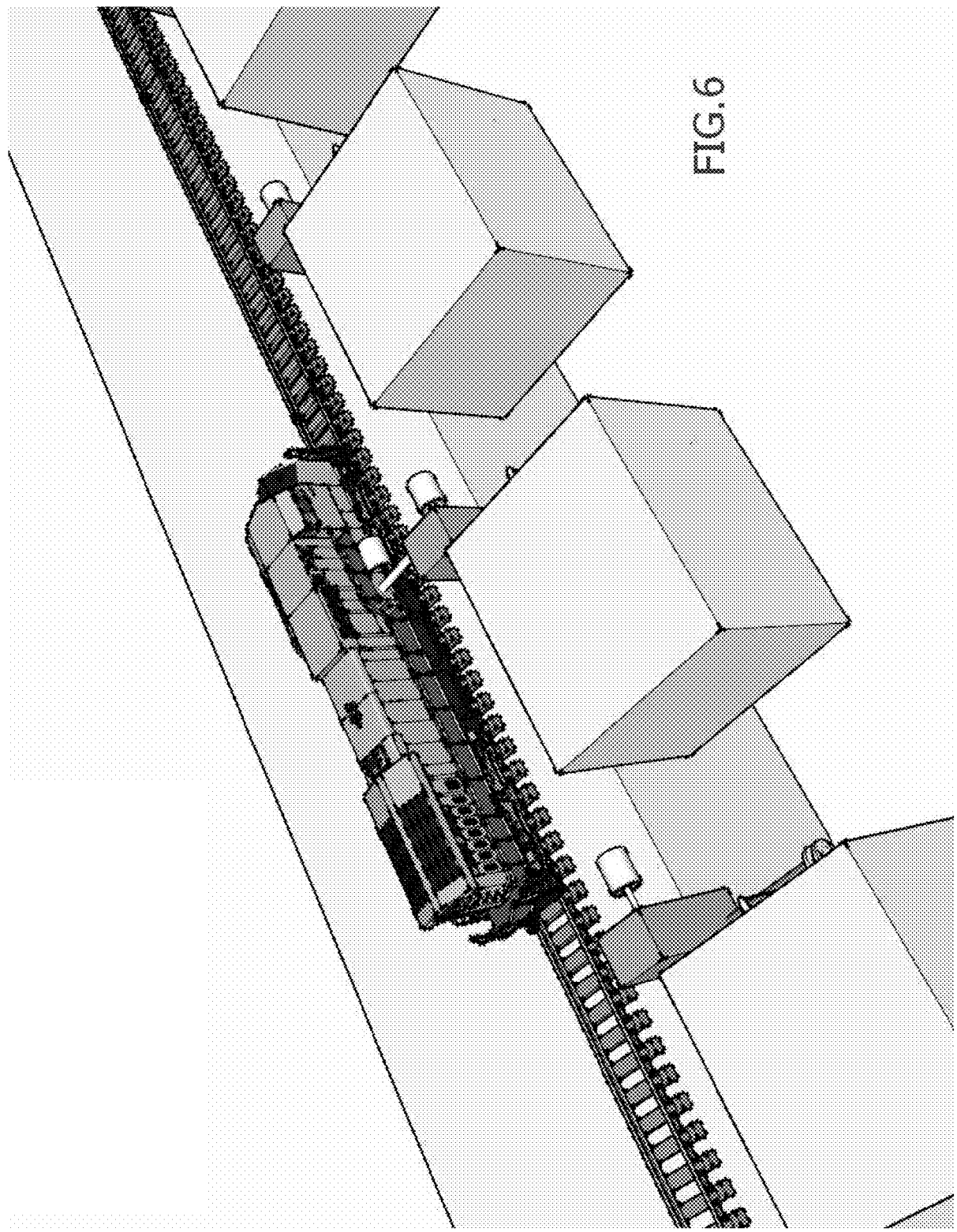

FIG. 6 Depicts diesel locomotive and a multiplicity of storage units. A conventional, known track and a conventional, known locomotive comprising a power take-off shaft are shown.

1) MAIN SHAFT
2) REEL
3) CABLE
4) FIRST SHAFT
5) SECOND SHAFT
6) TRANSMISSION
7) ELECTRIC MOTOR
8) ELECTRIC GENERATOR
9) ELECTRIC MOTOR/GENERATOR
10) ELECTRIC/ELECTRONIC INTERCONNECT
11) ELECTRIC/ELECTRONIC CONTROL UNIT
12) WATER SURFACE
13) ELECTRIC POWER GRID
14) BUOYANT OBJECT
15) SOLAR ARRAY
16) WIND TURBINE
17) HYDRAULIC PUMP
18) PNEUMATIC PUMP
19) TOWER
20) HYDRO TURBINE
21) LOCOMOTIVE POWER TAKE-OFF SHAFT

The invention claimed is:

1. An energy storage device comprising:
a first shaft comprising an input end and an output end to input rotational kinetic energy to be stored;
a main shaft comprising an input end and an output end;
a transmission operably connected to the output end of the first shaft and to the input end of the main shaft such that the transmission can change a rotation ratio between the first shaft and the main shaft;
a reel rigidly connected to the main shaft such that rotation of the main shaft causes rotation of the reel;
a storage unit comprising an object to be displaced vertically such that potential energy due to gravity can be increased, the object being operably connected to the reel;
a cable operably connected to the reel such that the rotation of the reel displaces the object vertically;
a second shaft comprising an input end and an output end to output the stored energy;
a second transmission operably connected to output end of the main shaft and to the input end of the second shaft such that the transmission can change the rotation ratio between the main shaft and the second shaft;
with the cable operably connected to the reel such that the rotation of the reel displaces the object vertically downward to increase potential energy;
wherein the object is a buoyant object,
wherein the input end of the first shaft is operably connected to a power take-off shaft of a diesel tractor such that the diesel tractor can rotate the first shaft.

2. The energy storage device as in claim 1, wherein the power take-off shaft of the diesel tractor is one of a plurality of input power sources operably connected to rotate the first shaft, the plurality of input power sources being selected from one or more of the following: a wind turbine, a hydraulic motor; a pneumatic motor, an electric motor, a hydro turbine, a tractive pulling force from a diesel tractor, a tractive pulling force from a diesel locomotive, a power take-off shaft of a diesel locomotive, a lifting force from a heavy-lift helicopter, and a hydrogen fuel cell.

3. The energy storage device as in claim 1, wherein the power take-off shaft of the diesel tractor is one of a plurality of input power sources operably connected to rotate the first shaft, the plurality of input power sources including one or more sources of energy selected from the following: a power grid, an electrical generator, solar energy, hydroelectric energy, geothermal energy, wind energy, ocean tidal energy, ocean current energy, ocean wave energy, ocean thermal energy, nuclear fission, nuclear fusion, electromechanical energy, energy from a chemical reaction, and mechanical energy.

4. The energy storage device as in claim 1, wherein the energy storage device further comprises one or more of the following: the output end of the second shaft operably connected to factory machinery such that the second shaft can rotate the factory machinery, the output end of the second shaft operably connected such that kinetic energy of the second shaft is transformed into electrical energy, the output end of the second shaft operably connected such that kinetic energy of the second shaft is transformed into hydraulic energy, and the output end of the second shaft operably connected such that kinetic energy of the second shaft is transformed into pneumatic energy.

5. An energy storage device comprising:

a first shaft comprising an input end and an output end to input rotational kinetic energy to be stored;

a main shaft comprising an input end and an output end;

a transmission operably connected to the output end of the first shaft and to the input end of the main shaft such that the transmission can change a rotation ratio between the first shaft and the main shaft;

a reel rigidly connected to the main shaft such that rotation of the main shaft causes rotation of the reel;

a storage unit comprising an object to be displaced vertically such that potential energy due to gravity can be increased, the object being operably connected to the reel;

a cable operably connected to the reel such that the rotation of the reel displaces the object vertically;

a second shaft comprising an input end and an output end to output the stored energy;

a second transmission operably connected to output end of the main shaft and to the input end of the second shaft such that the transmission can change the rotation ratio between the main shaft and the second shaft;

with the cable operably connected to the reel such that the rotation of the reel displaces the object vertically downward to increase potential energy;

wherein the object is a buoyant object, wherein a heavy lift helicopter is operably connected to the buoyant object such that the heavy lift helicopter can displace the massive object vertically downward to charge the system.

6. The energy storage device as in claim 5, wherein the input end of the first shaft is operably connected to a plurality of input power sources, wherein the plurality of input power sources are selected from one or more of the following: a wind turbine, a hydraulic motor, a pneumatic motor, an electric motor, a hydro turbine, a tractive pulling force from a diesel tractor or a diesel locomotive, a power take-off shaft of a diesel locomotive, a hydrogen fuel cell.

7. The energy storage device as in claim 5, wherein the plurality of input power sources include one or more sources of energy selected from the following: a power grid, an electrical generator, solar energy, hydroelectric energy, geothermal energy, wind energy, ocean tidal energy, ocean current energy, ocean wave energy, ocean thermal energy, nuclear fission, nuclear fusion, electromechanical energy, energy from a chemical reaction, and mechanical energy.

8. The energy storage device as in claim 5, wherein the energy storage device further comprises one or more of the following: the output end of the second shaft operably connected to factory machinery such that the second shaft can rotate the factory machinery, the output end of the second shaft operably connected such that kinetic energy of the second shaft is transformed into electrical energy, the output end of the second shaft operably connected such that kinetic energy of the second shaft is transformed into hydraulic energy, and the output end of the second shaft operably connected such that kinetic energy of the second shaft is transformed into pneumatic energy.

9. An energy storage device comprising:

a first shaft comprising an input end and an output end to input rotational kinetic energy to be stored;

a main shaft comprising an input end and an output end;

a transmission operably connected to the output end of the first shaft and to the input end of the main shaft such that the transmission can change a rotation ratio between the first shaft and the main shaft;

a reel rigidly connected to the main shaft such that rotation of the main shaft causes rotation of the reel;

a storage unit comprising an object to be displaced vertically such that potential energy due to gravity can be increased, the object being operably connected to the reel;

a cable operably connected to the reel such that the rotation of the reel displaces the object vertically;

a second shaft comprising an input end and an output end to output the stored energy;

a second transmission operably connected to output end of the main shaft and to the input end of the second shaft such that the transmission can change the rotation ratio between the main shaft and the second shaft;

with the cable operably connected to the reel such that the rotation of the reel displaces the object vertically downward to increase potential energy;

wherein the object is a buoyant object, wherein a diesel locomotive tractive pulling force is operably connected to the first shaft such that the diesel locomotive tractive pulling force can rotate the first shaft.

10. The energy storage device as in claim 9, wherein the diesel locomotive tractive pulling force is one of a plurality of input power sources operably connected to rotate the first shaft, the plurality of input power sources being selected from one or more of the following: a wind turbine, a hydraulic motor; a pneumatic motor, an electric motor, a hydro turbine, a tractive pulling force from a diesel tractor, a power take-off shaft of a diesel tractor, a power take-off shaft of a diesel locomotive, a lifting force from a heavy-lift helicopter, and a hydrogen fuel cell.

11. The energy storage device as in claim 9, wherein the diesel locomotive tractive pulling force is one of a plurality of input power sources operably connected to rotate the first shaft, the plurality of input power sources including one or more sources of energy selected from the following: a power grid, an electrical generator, solar energy, hydroelectric energy, geothermal energy, wind energy, ocean tidal energy, ocean current energy, ocean wave energy, ocean thermal energy, nuclear fission, nuclear fusion, electromechanical energy, energy from a chemical reaction, and mechanical energy.

12. The energy storage device as in claim 9, wherein the energy storage device further comprises one or more of the following: the output end of the second shaft operably connected to factory machinery such that the second shaft can rotate the factory machinery, the output end of the second shaft operably connected such that kinetic energy of the second shaft is transformed into electrical energy, the output end of the second shaft operably connected such that kinetic energy of the second shaft is transformed into hydraulic energy, and the output end of the second shaft operably connected such that kinetic energy of the second shaft is transformed into pneumatic energy.

13. An energy storage device comprising:
a first shaft comprising an input end and an output end to input rotational kinetic energy to be stored;
a main shaft comprising an input end and an output end;
a transmission operably connected to the output end of the first shaft and to the input end of the main shaft such that the transmission can change a rotation ratio between the first shaft and the main shaft;
a reel rigidly connected to the main shaft such that rotation of the main shaft causes rotation of the reel;
a storage unit comprising an object to be displaced vertically such that potential energy due to gravity can be increased, the object being operably connected to the reel;
a cable operably connected to the reel such that the rotation of the reel displaces the object vertically;
a second shaft comprising an input end and an output end to output the stored energy;
a second transmission operably connected to output end of the main shaft and to the input end of the second shaft such that the transmission can change the rotation ratio between the main shaft and the second shaft;
with the cable operably connected to the reel such that the rotation of the reel displaces the object vertically downward to increase potential energy;
wherein the object is a buoyant object,
wherein a diesel tractor tractive pulling force is operably connected to the first shaft such that the diesel tractor tractive pulling force can rotate the first shaft.

14. The energy storage device as in claim 13, wherein the diesel tractor tractive pulling force is one of a plurality of input power sources operably connected to rotate the first shaft, the plurality of input power sources being selected from one or more of the following: a wind turbine, a hydraulic motor; a pneumatic motor, an electric motor, a hydroturbine, a tractive pulling force from a diesel tractor, a power take-off shaft of a diesel tractor, a power take-off shaft of a diesel locomotive, a lifting force from a heavy-lift helicopter, and a hydrogen fuel cell.

15. The energy storage device as in claim 13, wherein the diesel tractor tractive pulling force is one of a plurality of input power sources operably connected to rotate the first shaft, the plurality of input power sources including one or more sources of energy selected from the following: a power grid, an electrical generator, solar energy, hydroelectric energy, geothermal energy, wind energy, ocean tidal energy, ocean current energy, ocean wave energy, ocean thermal energy, nuclear fission, nuclear fusion, electromechanical energy, energy from a chemical reaction, and mechanical energy.

16. The energy storage device as in claim 13, wherein the energy storage device further comprises one or more of the following: the output end of the second shaft operably connected to factory machinery such that the second shaft can rotate the factory machinery, the output end of the second shaft operably connected such that kinetic energy of the second shaft is transformed into electrical energy, the output end of the second shaft operably connected such that kinetic energy of the second shaft is transformed into hydraulic energy, and the output end of the second shaft operably connected such that kinetic energy of the second shaft is transformed into pneumatic energy.

\* \* \* \* \*